US012759937B2

(12) United States Patent
Chau et al.

(10) Patent No.: US 12,759,937 B2
(45) Date of Patent: Oct. 13, 2026

(54) NANO-MODIFIED SOL-GEL TECHNOLOGY FOR ACCELERATED SOIL STABILIZATION

(71) Applicant: Nano and Advanced Materials Institute Limited, Hong Kong (HK)

(72) Inventors: Chung Kong Chau, Hong Kong (HK); Nok Hang Enoch Wong, Hong Kong (HK); Shuai Zou, Hong Kong (HK); Yong Fan, Hong Kong (HK); Man Lung Sham, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 572 days.

(21) Appl. No.: 18/159,107

(22) Filed: Jan. 25, 2023

(65) Prior Publication Data

US 2023/0295045 A1 Sep. 21, 2023

Related U.S. Application Data

(60) Provisional application No. 63/302,589, filed on Jan. 25, 2022.

(51) Int. Cl.
*C04B 28/04* (2006.01)
*C04B 28/00* (2006.01)
(Continued)

(52) U.S. Cl.
CPC ............ *C04B 28/04* (2013.01); *C04B 28/005* (2013.01); *C04B 28/006* (2013.01); *C04B 2103/445* (2013.01); *C04B 2111/00767* (2013.01)

(58) Field of Classification Search
CPC ..... C04B 28/04; C04B 28/005; C04B 28/006; C04B 2103/445; C04B 2111/00767; C04B 2111/00732
See application file for complete search history.

(56) References Cited

U.S. PATENT DOCUMENTS 4,642,137 A * 2/1987 Heitzmann ........... C04B 12/005 106/607
8,808,442 B2 8/2014 Bernu et al.
(Continued)

FOREIGN PATENT DOCUMENTS

CN 100460600 C 2/2009
CN 103013526 B 11/2014
(Continued)

OTHER PUBLICATIONS

Identification of Waste—Waste Management, Environmental Impact Assessment, the government of Hong Kong, ERM, pp. 1-10.
(Continued)

*Primary Examiner* — Pamela H Weiss
(74) *Attorney, Agent, or Firm* — IDEA Intellectual Limited; Sam T. Yip

(57) ABSTRACT

A reclamation fill stabilizing composition for accelerated soil stabilization of high water-content waste soils/marine mud. The fill stabilizing composition includes a hydrolysis polymerization agent for chemically reacting with water in waste soil/marine mud. A gelling geopolymerization agent chemically and physically locks the water in its formed 3-D alumino-silicate microstructure. A sol-gel immobilization agent chemically and physically traps the water by reacting and bonding with the water. A nano-modification agent provides additional crystal nuclei to increase the effects of hydrolysis polymerization, gelling geopolymerization, and sol-gel immobilization. The reclamation fill stabilizing composition is mixed with high water-content waste soil such as marine mud. The marine mud is rapidly transformed into a compactable fill material within a stabilization curing period as short as 3 hours. Following stabilization, the treated marine mud is compacted (e.g., with a vibratory roller) into
(Continued)

a layer of about 240~300 mm with adequate stiffness (CBR value of at least 15%).

7 Claims, 8 Drawing Sheets

(51) Int. Cl.
*C04B 103/44* (2006.01)
*C04B 111/00* (2006.01)

(56) References Cited

U.S. PATENT DOCUMENTS

| | | | | |
|---|---|---|---|---|
| 10,759,697 | B1 * | 9/2020 | Lukkarila | C04B 18/067 |
| 2012/0024196 | A1 * | 2/2012 | Gong | C04B 7/243<br>404/72 |
| 2014/0047999 | A1 * | 2/2014 | Razl | C04B 28/021<br>106/676 |
| 2014/0374097 | A1 * | 12/2014 | Morgan | C09K 8/44<br>166/293 |
| 2019/0382308 | A1 * | 12/2019 | Wang | C04B 14/005 |
| 2021/0053872 | A1 * | 2/2021 | Larsen | C04B 28/02 |
| 2021/0101832 | A1 * | 4/2021 | Rademan | C04B 40/0231 |

FOREIGN PATENT DOCUMENTS

| | | | | |
|---|---|---|---|---|
| WO | 2010091029 | A1 | 8/2010 | |
| WO | WO-2017072689 | A1 * | 5/2017 | C04B 28/006 |

OTHER PUBLICATIONS

"TCE waste management status—Monthly Environmental Monitoring & Audit Report for Aug. 2019", Civil Engineering and Development Department, Aug. 2019.
"CEDD Port works design manual—Port Works Design Manual Part 3", Civil Engineering Office, the government of the Hong Kong Special Administrative Region, Aug. 2022.
"Deep Cement Mixing Method in manual—Port Works Design Manual" Corrigendum No. Jan. 2020.
The Project Team of the Building Contract for Public Housing Development at Kai Tak Site 1A of Housing Department 1 et al. "Sustainability Solution Unlimited—Green Treatment of Marine Mud for Building Materials" HKIE Environmental Division 2012 Environmental Paper Award.
The Project Team of the Foundation Contract for Public Housing Development at Kai Tak Site 1A of Housing Department et al., "Green Treatment of Marine Mud for Insitu Backfilling" 2010 Environmental Paper Award, HKIE Environmental Division.

* cited by examiner

Marine DCM for Seawall Foundation and Land DCM for Reclamation

Heaved Materials during DCM Operation

NANO-MODIFIED SOL-GEL TECHNOLOGY FOR ACCELERATED SOIL STABILIZATION

CROSS-REFERENCE TO RELATED APPLICATIONS

The present application claims priority from U.S. Provisional Patent application No. 63/302,589 filed Jan. 25, 2022; the disclosure of which is incorporated herein by reference in its entirety.

FIELD OF THE INVENTION

The present disclosure relates to accelerated soil stabilization, and, more particularly, to soil stabilization composition and methods that have rapid curing periods and may be used to stabilize wet soils such as extracted marine mud.

BACKGROUND

Land reclamation creates new, usable land from adjoining oceans, seas, bays, rivers, and lakes through a land fill process. Land reclamation can be achieved through various techniques. In an infill process, large amounts of gravel, rocks, cement, lay and dirt/soil and built up to create a particular height that is higher than the adjacent body of water. In a dredging process, mud that is dredged from the bottom of an adjacent body of water is deposited on the existing land to extend the shoreline.

Deep cement mixing is a newer land reclamation technique that is used to minimize the displacement of the sea bed. A schematic depiction of deep cement mixing (DCM) is depicted in FIG. 3. This technique may be used when it is undesirable to disturb the sea bed due to contamination of the soil. During deep cement mixing, auger-based equipment drills into the sea bed followed by injection of a binder material, typically a cement-based mixture, such as a cement slurry. The soft surrounding sea bed blends with the cement-based mixture and hardens. Additional binder is added and a column-like structure is formed. The height of the column can be increased through additional injection of the cement-based mixture. Using these cement "columns" as a foundation or as a seawall, additional soil/dirt is layered on top (or adjacent to the sea wall) to create the desired area of land. This technique has been used to create large land areas including expansion of the Hong Kong International Airport and the Tokyo Haneda Airport.

A by-product of deep cement mixing is heave and horizontal displacement of the ground. Heaved materials and their location are depicted in FIG. 3. This results in some construction waste which comprises a saturated mixture of sand blanket, disturbed marine deposit and cement slurry, recognized as "heaved marine mud." DCM works typically result in many tons of heaved marine mud to be managed. A photograph of heaved materials is depicted in FIG. 4. Under normal circumstances, this marine mud may be disposed of in landfills or marine dumping sites. However, these disposal options were not sustainable from both environmental and technical perspectives. Further, during land reclamation projects, it is desirable to use the marine mud as infill to build up the height of the reclaimed land at the designed height above sea level.

Further, geotechnical engineering projects include earthworks and foundation engineering. The foundation engineering works generate considerable construction and demolition (C&D) materials and sediments including rock, soft materials, artificial hard materials, timber, papers, plastics and marine deposits. The normal practice is to dispose of these debris as public fill, at landfill or marine dumping sites, leading to environmental concerns. A green approach to using these debris is desirable, recycling the debris into usable fill material.

Currently, marine mud is treated such that it can be used as land fill in reclamation projects in order to minimize the environmental burden and handling cost. The treatment converts soft marine mud into a material suitable for fill by a cement-stabilization process. Although this treatment allows for the wet marine mud to be used as fill, it requires a curing time up to one week or even more depending on the weather and working conditions, which is too slow to process the large volumes of heaved marine. Further, a very large area is required while the marine mud is being cured. During the curing time, this area cannot receive new applications of marine mud until the old marine mud has been fully cured. Therefore, a more efficient solution is required.

Thus, there is a need in the art for improved techniques for handling marine mud and construction debris; such techniques could be used during large-scale land reclamation projects.

SUMMARY OF THE INVENTION

The present invention shortens the curing time of heaved marine mud such that it rapidly becomes usable fill, therefore increasing the productivity of the reclamation project. The invention provides a multi-functional solidifier and an associated treatment process. The heaved marine mud is first mixed with the solidifier, which combining various mechanisms including sol-gel immobilization, geopolymerization, hydration and absorption. The physical state of the treated marine mud can be quickly changed and suitable for compaction process, which allows building up of subsequent layers.

In one aspect, the present invention provides a reclamation fill accelerated stabilization composition for efficient recycling of high water-content waste soils. The fill stabilizing composition includes a hydrolysis polymerization agent for chemically reacting with water in the high water-content waste soil. A gelling geopolymerization agent chemically and physically locks the water in its formed 3-D alumino-silicate microstructure. Further, a sol-gel immobilization agent chemically and physically traps the water by reacting and bonding with the water. A nano-modification agent provides additional crystal nuclei to increase the effects of hydrolysis polymerization, gelling geopolymerization, and sol-gel immobilization. As a result, the physical state of the treated marine mud is quickly changed and suitable for the subsequent compaction process.

In a further aspect the reclamation fill stabilizing composition is mixed with high water-content waste soil such as marine mud. The marine mud is rapidly cured by the fill stabilizing composition, typically in approximately three hours. Following curing, the cured marine mud is compacted (e.g., with a vibratory roller) such that further layers may be deposited on the cured layer. Optionally, the marine mud is mixed with sorted public fill. The sorted public fill may include rocks, concrete, asphalt, rubble, bricks, stones, and soil. The mechanical properties of treated marine mud can be enhanced after mixing with sorted public fill.

DETAILED DESCRIPTION

Figure 1:
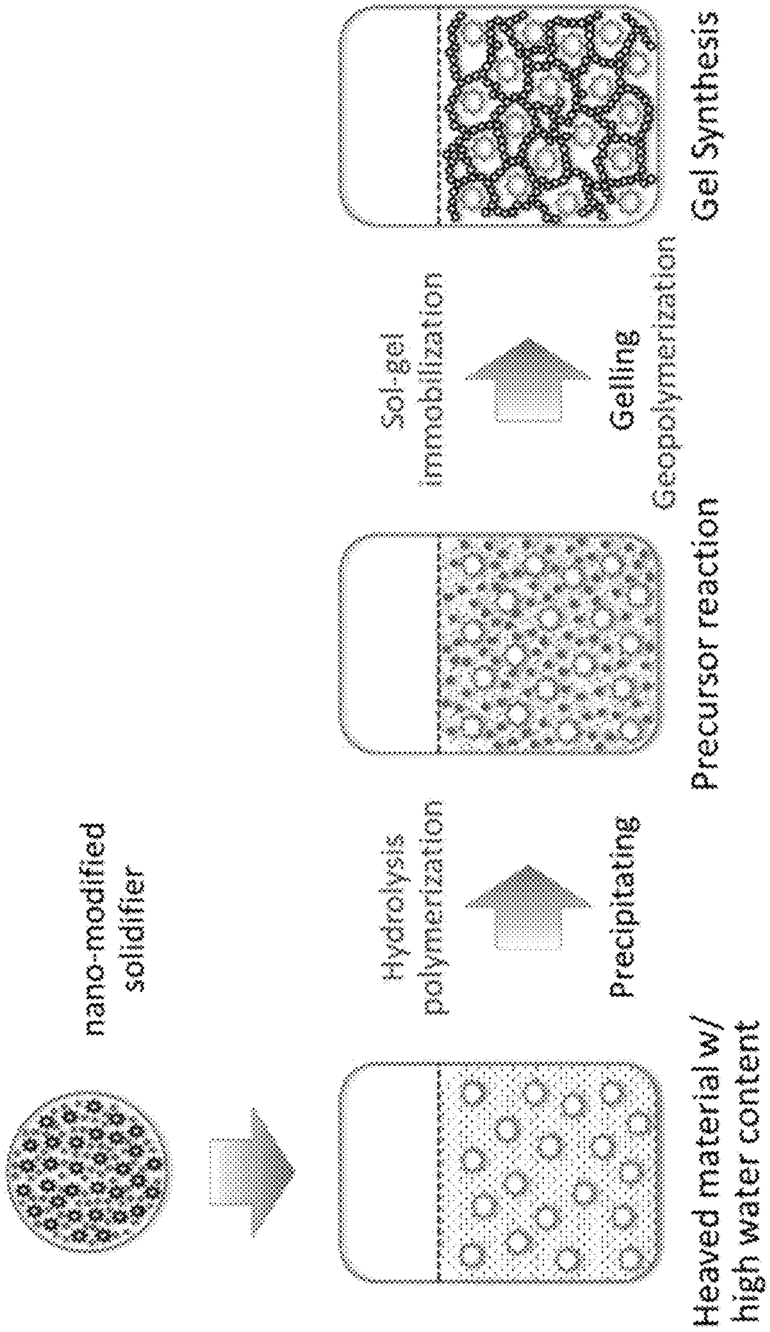
FIG. 1 schematically depicts the action of the nano-modified reclamation fill stabilization composition of the present invention.

The present invention provides a composition for accelerated soil stabilization useful in land reclamation projects. Using the rapid stabilization composition permits compaction of heaved marine mud layers following a curing period of as little as three hours. The reclamation fill stabilizing composition includes a hydrolysis polymerization agent, a gelling geopolymerization agent, a sol-gel immobilization agent, and a nano-modification agent. Typically, marine mud has a water content of 50% or more; therefore, the components of the reclamation fill stabilizing composition target the water content, reacting or encapsulating the water to rapidly cure the marine mud, allowing rapid compaction and continued fill deposit on the site.

The hydrolysis polymerization agent chemically reacts with water in the high water-content waste soil. The hydrolysis polymerization agent is present in the fill stabilizing composition in an amount from approximately 38% to approximately 90% percent of the fill stabilizing composition. The hydrolysis polymerization agent may be one or more of ordinary Portland cement (OPC), fly ash, slag, or waste glass powder. Examples for individual components are, for OPC, approximately 15% to approximately 45% of the fill stabilizing composition. Fly ash, slag, or waste glass powder may each be present in an amount from approximately 1.5% to approximately 4%. Note that the hydrolysis polymerization agent may include one, two, three, or all four of these components. Further details of exemplary compositions are set forth in the Examples section, below.

The gelling geopolymerization agent chemically and physically locks water from the marine mud in its formed 3-D alumino-silicate microstructure. The gelling geopolymerization agent is present in the fill stabilizing composition in an amount from approximately 38% to approximately 90% percent of the fill stabilizing composition. Gelling geopolymerization agents may be one or more of fly ash, slag, or waste glass powder, or potassium silicate. Fly ash, slag, or waste glass powder may each be present in an amount from approximately 1.5% to approximately 4% while potassium silicate may be present in an amount from approximately 15% to approximately 45% of the fill stabilizing composition.

A sol-gel immobilization agent reacts and bonds with the water and is present in the fill stabilizing composition in an amount from 15% to 45% of the total fill stabilizing composition. The sol-gel immobilization agent may be potassium silicate in an amount from 15% to 45% and/or calcium oxide in an amount from 15% to 45% of the fill stabilizing composition.

A nano-modification agent provides additional crystal nuclei to increase the effects of hydrolysis polymerization, gelling geopolymerization, and sol-gel immobilization agents. For example, nano-sized silica in an amount of approximately 1% to 3% of the fill stabilizing composition may be used.

Selection of particular components and their respective amounts in the fill stabilizing composition is performed in conjunction with a soil analysis of the waste soil to be treated. Factors affecting choice of components include moisture content, soil particle size, whether the soil/mud is silica-based (e.g., predominantly sandy soil), clay-based, or silt-based (fine rock and mineral particles). Changes in these soil/mud compositions lead to optimization of the above ranges. For example, for wetter soil/mud compositions, a larger quantity of hydrolysis polymerization agent is used while for soils with a higher clay/sand/silt component, a larger amount of geopolymerization agent is used.

FIG. 1 schematically depicts how the fill-stabilizing composition reacts with marine mud/waste soil to create a three-dimensional network that hardens the layer and allows the heaved mud/soil to be readily compacted for additional layer build-up. As seen in FIG. 1, addition of the rapid-solidifying modifier to the waste soil with high water content initially undergoes hydrolysis polymerization for partial stabilization while sol-gel and gel polymerization further create three-dimensional interpenetrating networks until the mud/soil is fully cured. Although a typical curing period is approximately three hours, depending upon the starting mud/soil and the overall selected composition, the curing time may be from three to approximately six hours. Larger curing times are also achievable such as 24 or 48 hours, depending upon project requirements.

Following the mixing process and required curing period, the treated marine mud/soil will be compacted into a layer of about 240~300 mm, for example, using a vibratory roll compactor (with 6 to 10 passes) with an adequate stiffness measured by a California Bearing Ratio (CBR) of at least 15%. A surcharge load will be formed by layering up of such compacted layers. Therefore, the general sequence of the process is mixing the mud with the inventive composition, curing, compaction to reach a desired stiffness, followed by additionally layering where the process repeats.

Without the prolonged curing time required by previous techniques, the treated marine mud/waste soil no longer needs to be stockpiled for the curing process, thus, less working space is required. This a time and cost saving approach on worksites with limited space to deal with waste soil/mud from, for example, deep cement mixing or dredging from sea or river beds.

The amount of fill stabilizing composition that is added to marine mud/waste soil is typically in a range of approximately 10% to 30%. The amount selected is based on the soil composition, the amount of water in the soil, and the desired final stiffness/hardness after compaction, and/or curing time. As will be seen in the Examples below, different results are obtained for different selected fill stabilizing additives.

EXAMPLES

I. Test Matrix

A wide variety of compositions was tested with heaved marine mud to determine the curing times, stiffness, and amount of the accelerated soil stabilization compositions of the present invention.

with the remainder being solids content. The average plasticity index was 28.7% while the average fines content by mass (that is, particles smaller than 63 microns) is 47.8% All of the compositions were selected to provide a curing time of approximately 3 to 5 hours. In this manner the effects of the individual components on the overall composition can be determined. The test matrix is depicted in Table 1 below:

TABLE 1

Test matrix of compositions (laboratory testing)

| | Nano-Modified Sol-Gel Technology for Accelerated Soil Stabilization | | | | | | | | | |
|---|---|---|---|---|---|---|---|---|---|---|
| | Hydrolysis polymerization agent | | | | | | | | | |
| | | Gelling geopolymerization agent | | | | | | Curing | | |
| | | | | Waste | Sol-gel immobilization agent | | Nano-modification | time before | Setting | Lab CBR |
| # | OPC | Fly ash | Slag | glass powder | Potassium silicate | Calcium oxide | Nano-silica | CBR (hour) | time (minute) | value % |
| 4 | 30% | 3% | 3% | 2% | 45% | 15% | 2% | 3-5 | 20 | 40 |
| 5 | 15% | 3% | 3% | 2% | 45% | 30% | 2% | 3-5 | 23 | 38 |
| 6 | 45% | 3% | 3% | 2% | 30% | 15% | 2% | 3-5 | 25 | 35 |
| 7 | 15% | 3% | 3% | 2% | 30% | 45% | 2% | 3-5 | 35 | 25 |
| 8 | 45% | 3% | 3% | 2% | 15% | 30% | 2% | 3-5 | 38 | 22 |
| 9 | 30% | 3% | 3% | 2% | 15% | 45% | 2% | 3-5 | 40 | 17 |
| 10 | 30% | 3% | 3% | 1% | 30% | 30% | 3% | 3-5 | 28 | 32 |
| 11 | 30% | 3% | 3% | 3% | 30% | 30% | 1% | 3-5 | 32 | 28 |

In a first series of composition tests, the effect of various composition components was determined. In particular, the effect of the components on important soil compaction parameters such as the CBR value is determined. In the first series of composition tests, each composition is mixed with heaved marine mud having the same water and soil content at a mixing amount of 20%.

In a second series of composition tests, the composition is maintained constant, and the percentage of the selected composition is mixed at different amounts with heaved marine mud to determine an optimum amount for a given project based on the design CBR values and selected desired curing time.

It is noted that, for both composition tests, the properties were measured in a laboratory setting. In a laboratory setting, the controlled conditions and homogenous mixing conditions result in superior values for properties such as CBR. A higher CBR value than required in the field assures that the use of the composition in an actual land reclamation project will still be acceptable under the imperfect field conditions. However, these laboratory trials still provide important results for determining composition effect as well as mixing ratio effects.

Finally, a selected composition was subjected to a field trial to demonstrate effectiveness of the present invention on an active land reclamation project site.

A. Effects of Composition Components on Overall Properties:

The major composition components, that is, the hydrolysis agent (e.g., OPC), the geopolymerization agent (e.g., potassium silicate), and sol-gel immobilization agent (e.g., calcium oxide) were varied among compositions and mixed at the same percentage (20%) with heaved marine mud. The heaved marine mud is carefully controlled such that all of the laboratory samples included a water content of 66.7%

1. Sample Number 4: 30% OPC/45% Potassium Silicate/15% Calcium Oxide

In sample number 4 the effects of potassium silicate were examined in connection with less sol-gel immobilization agent (calcium oxide). The composition is 30% OPC, 3% fly ash, 3% slag, 2% waste glass powder, 45% potassium silicate, 15% calcium oxide, and 2% nano silica. Potassium silicate is a geopolymerization agent and, through reactions with other ingredients, forms a three-dimensional polymeric chain and ring structure that can be formed at room temperature. Through the use of a higher amount of geopolymerization agent, the water in the heaved materials is locked into the structure through geopolymerization; consequently, less water is trapped by the sol-gel immobilization agent (calcium oxide). Since geopolymerization provided the strongest and fastest effect while immobilization provided the weakest and slowest effect, the setting time for this sample was the shortest and the CBR value was the highest compared with other suitable usage groups.

2. Sample Number 5: 15% OPC/45% Potassium Silicate/30% Calcium Oxide

In sample number 5 the effects of potassium silicate were examined in connection with less hydrolysis agent (OPC). The composition is 15% OPC, 3% fly ash, 3% slag, 2% waste glass powder, 45% potassium silicate, 30% calcium oxide, and 2% nano silica. In this composition, with more main geopolymerization agent (potassium silicate) and less main hydrolysis agent (OPC), the water in the heaved materials was captured/locked by the geopolymerization agent and while being less consumed by hydration. Since the hydration effect is typically a faster and stronger process than the immobilization effect, the setting time slightly increased and the CBR value was somewhat lower than group 4; however, this composition is still within the design CBR and setting time values.

3. Sample Number 6: 45% OPC/30% Potassium Silicate/ 15% Calcium Oxide

In sample number 6 the effects of the OPC hydrolysis agent were examined in connection with less sol-gel immobilization agent (calcium oxide). The composition is 45% OPC, 3% fly ash, 3% slag, 2% waste glass powder, 30% potassium silicate, 15% calcium oxide, and 2% nano silica. This composition was found to be a suitable usage composition within the required design parameters. With more main hydrolysis agent (OPC) and less main sol-gel immobilization agent (calcium oxide), the water in the heaved materials was consumed more by the hydration process; consequently, less water is trapped by sol-gel immobilization. Since the hydration process is faster and results in a stronger sample than those dominated by the sol-gel immobilization effect, the setting time was slightly shorter and the CBR value was slightly higher than the standard group 2 composition (to be discussed in further detail below—that is, a composition of 30% OPC/30% Potassium Silicate/30% Calcium Oxide).

4. Sample Number 7: 15% OPC/30% Potassium Silicate/ 45% Calcium Oxide

In sample number 7, the effects of the sol-gel immobilization agent (calcium oxide) were examined in connection with less hydrolysis agent (OPC). The composition is 15% OPC, 3% fly ash, 3% slag, 2% waste glass powder, 30% potassium silicate, 45% calcium oxide, and 2% nano silica. This composition was suitable for use in soil stabilization although having with less main hydrolysis agent (OPC) and more main immobilization agent (calcium oxide). The water in the heaved materials was less consumed by hydration and, instead, was trapped by immobilization in greater quantities. Since the hydration effect is faster and stronger than the immobilization effect, the setting time for this composition was a little longer and the CBR value was a little lower than the standard group 2.

5. Sample Number 8: 45% OPC/15% Potassium Silicate/ 30% Calcium Oxide

In sample number 8, the effects of the hydrolysis agent (OPC) were tested against lower amounts of the geopolymierization agent (potassium silicate). The composition is 45% OPC, 3% fly ash, 3% slag, 2% waste glass powder, 15% potassium silicate, 30% calcium oxide, and 2% nano silica. Suitable usage with less geopolymerization agent (potassium silicate) and more main hydrolysis agent (OPC). In this composition, the water in the heaved materials was more consumed in the process of hydration while less of the water was locked by geopolymerization. Since the hydration effect was slower and weaker than geopolymerization effect, the setting time increased and the CBR value decreased.

6. Sample Number 9: 30% OPC/15% Potassium Silicate/ 45% Calcium Oxide

In sample number 9, the effects of the sol-gel immobilization agent (OPC) were tested against lower amounts of the geopolymerization agent (potassium silicate). The composition is 30% OPC, 3% fly ash, 3% slag, 2% waste glass powder, 15% potassium silicate, 45% calcium oxide, and 2% nano silica. This composition showed suitable properties (setting time and CBR values) for use in land reclamation. With less geopolymerization agent (potassium silicate) and more main sol-gel immobilization agent (calcium oxide), the water in the heaved materials was less locked by geopolymerization with higher amounts trapped by sol-gel immobilization. Since geopolymerization was the strongest and fastest effect while immobilization was the weakest and slowest effect, the setting time in this group was the longest and the CBR value was the smallest compared with a 30/30/30 composition.

7. Sample Number 10: 30% OPC/30% Potassium Silicate/ 30% Calcium Oxide Nano Modifier Varied.

Samples 10 and 11 used equal amounts of hydrolysis agent, geopolymerization agent, and sol-gel immobilization agent (30/30/30 percent). In these compositions, the effects of the nano modifier on the overall composition were determined. In sample 10, 3% fly ash, 3% slag, 1% waste glass powder were used. The nano modifier (nano silica) was increased to 3% of the composition total. The increased amount of nano modifier demonstrated more crystal nuclei for hydration and geopolymerization. As a result, the setting time was a little shorter and the CBR value was a little higher than the standard group 2 with 2 percent nano-silica.

8. Sample Number 11: 30% OPC/30% Potassium Silicate/ 30% Calcium Oxide Nano Modifier Varied.

Sample 11 used equal amounts of hydrolysis agent, geopolymerization agent, and sol-gel immobilization agent (30/30/30 percent). In sample 11, 3% fly ash, 3% slag, 3% waste glass powder were used. The nano modifier (nano silica) was decreased to 1% of the composition total. This composition was determined to be acceptable, producing CBR and setting times within the design parameters. Since fewer crystal nuclei were provided for hydration and geopolymerization, the setting time was a little longer and the CBR value was a little lower than the standard group 2.

B. Effects of Mixing Percentage with Heaved Marine Mud for a Given Composition

In a second series of tests, a selected composition, 30% OPC, 3% fly ash, 3% slag, 2% waste glass powder, 30% potassium silicate, 30% calcium oxide, and 2% nano silica, was mixed at 10%, 20% and 30% with the same heaved marine mud of the test matrix trials of Part A, above. The 30/30/30 composition was selected as showing a favorable combination of hydrolysis, geopolymerization, and sol-gel immobilization such that a favorable curing time and CBR value are produced in the cured marine mud. It is understood that the above matrix of tests would be repeated when undertaking an actual reclamation project using the heaved mud at the project site. This is because different soil compositions and different water amounts will affect the curing time and CBR values such that the selected composition will be varied both in components and in amounts used based on the actual location. Additionally, daily site conditions such as temperature, humidity, presence of precipitation, will affect the amounts of the composition to be used. For example, at a site undergoing a large volume of precipitation (for example, during a rainy season), it may be desirable to increase the percentage of the composition used with the marine mud. These variations will be undertaken by site engineering managers who can determine any changes based on site conditions.

Table 2, below, shows the selected composition for 10%, 20% and 30% mixing with heaved marine mud. A discussion of the results follows Table 2:

TABLE 2

| | | Nano-Modified Sol-Gel Technology for Accelerated Soil Stabilization | | | | | | | | | |
|---|---|---|---|---|---|---|---|---|---|---|---|
| | | Hydrolysis polymerization agent | | | | | | | | | |
| | | | Gelling geopolymerization agent | | | | | | Curing | | |
| | % MIX | | | | Waste | Sol-gel immobilization agent | | Nano-modification | time before | Setting | Lab CBR |
| # | With MUD | OPC | Fly ash | Slag | glass powder | Potassium silicate | Calcium oxide | Nano-silica | CBR (hour) | time (minute) | value % |
| 1 | 10% | 30% | 3% | 3% | 2% | 30% | 30% | 2% | 22-24 | 50 | 30 |
| 2 | 20% | 30% | 3% | 3% | 2% | 30% | 30% | 2% | 3-5 | 30 | 30 |
| 3 | 30% | 30% | 3% | 3% | 2% | 30% | 30% | 2% | 1-2 | 10 | 30 |

Sample 1 uses a very low amount of the fill stabilizing composition (10%). Although this low usage amount (10%) provides cost savings to the reclamation project, the long setting time of nearly one day to reach an acceptable CBR value may limit its practical use on a land reclamation site, particularly one with limited working area. However, on an extremely large land reclamation project where there is sufficient room to wait for curing, this low amount may be acceptable in order to minimize costs of the fill stabilizing composition since an acceptable CBR value is reached following the curing period.

Sample 2 uses an acceptable amount of the fill stabilizing composition (20%) in order to achieve a suitably rapid curing time of 3-5 hours to reach an acceptable CBR value. In an average reclamation site project, this rapid curing time allows subsequent deposits of treated fill to be layered on top of the cured layer within the same work day.

Sample 3 shows a large usage amount of 30%. As a result, the setting time and curing time were very short-approximately 1-2 hours. Typically, such a short time is not necessary in order to perform the next step of construction on a reclamation site. However, reclamation sites experiencing large amounts of regular precipitation, as, for example, during the rainy season, may determine that this larger percentage of fill stabilizer is necessary to reach the desired cure and CBR value. A site engineer typically makes such a determination based on field tests.

II. Field Trials

A. Comparative Example

A comparative example based on the Tung Chung New Town Extension project at Lantau Island, Hong Kong is shown as below. As seen in Table 3, the CBR values are higher for using the inventive composition while substantially reducing the cure time.

TABLE 3

| Comparison with Prior Art OPC Slurry | | | | |
|---|---|---|---|---|
| Marine heaved material treated by | OPC Slurry | Compacted Ground | Inventive Fill Stabilizer | |
| Mixed with 2 parts of sorted public fill | Yes | All | Yes | No |
| Curing time before compaction | 24 hours | — | 3 hr | 3 hr |
| CBR Value | <15% | 18% | 17% | >25% |

In general, the presence of organic substances had a negative effect on the stabilization effectiveness. Humic acids and other acid groups react with calcium hydroxide, forming insoluble products. The pH value will decrease and the strength gain will be slower. Other than organic substances, similar chemical reactions result when marine mud is rich in ammonium and magnesium salts; these materials react with hydroxide ions and lower the pH value.

The accelerated soil stabilization process of the present invention generates no VOC or harmful gas emission, is both physically and chemically stable, and insoluble and fire resistant.

Figure 2:
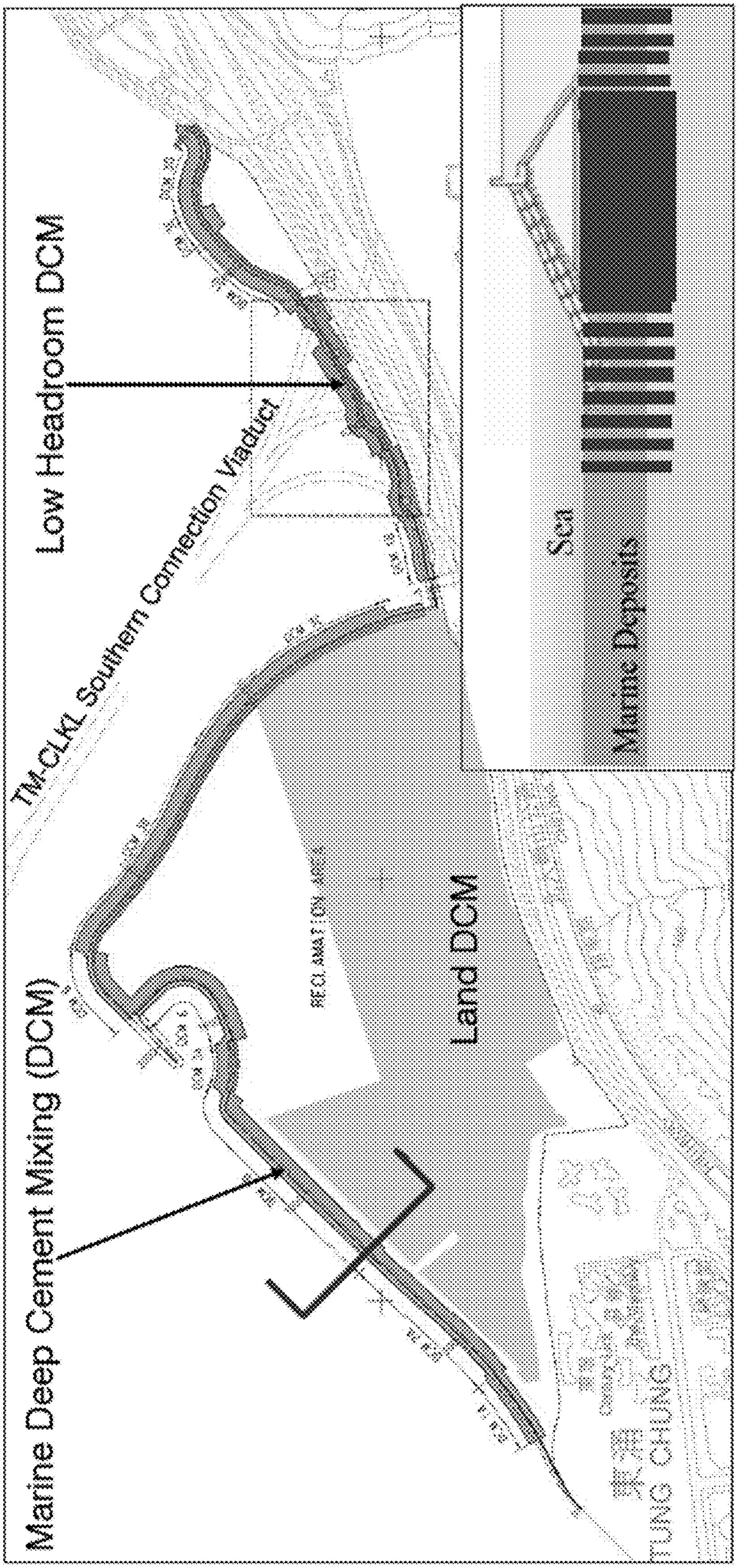
FIG. 2 depicts a cross-sectional view of reclaimed land with DCM columns, the marine deposits, sea level and adjacent fill-deposited reclaimed land.
Figure 3:
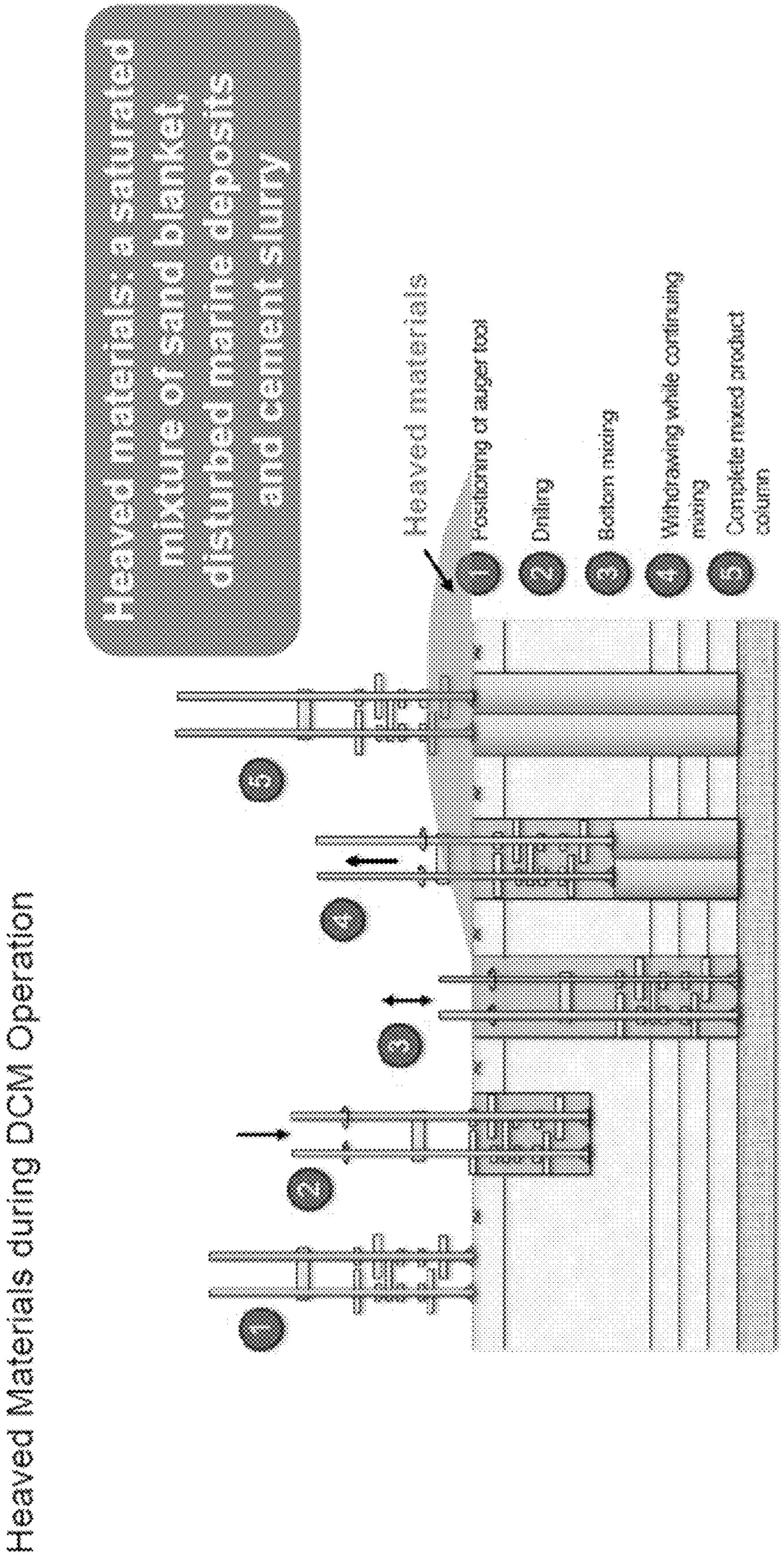
FIG. 3 depicts heaved materials formed from DCM processes during land reclamation.
Figure 4:
FIG. 4 is a photograph of heaved materials to be used as a starting material to be mixed with the fill stabilization compositions of the present invention.

2. Tung Chung Extension Reclamation Site:

Compositions of the present invention were trialed in a land reclamation project in Hong Kong. Land reclamation projects are ongoing in Tung Chung, an area of Lantau near the Hong Kong International Airport (Chek Lap Kok). This area is shown in the map of FIG. 2.

TCE reclamation uses DCM method to speed up the reclamation works. The reinforced sediment becomes a composite and the DCM treated-soil act like pillars to sustain the majority of the loading to control settlement as seen in the map inset of FIG. 2. DCM methods solidify the ground quickly and can advance the completion of reclamation by about 6 months as for the case in TCE when compared with the conventional drained method of land reclamation. The reclamation works began in 2017, and is scheduled for general completion by 2023. With the use of DCM technology, the first parcel of land (about 7 hectares) was formed and delivered for public housing development in just 27 months since the commencement of the works contract.

Apart from accelerating the reclamation project, the demand for fill material for replenishing settlement can be reduced. In the Tung Chung reclamation, up to around 6 million tonnes of fill material was saved. This not only eased the demand for fill material but also reduced 3,000 vessel trips passing through the north Lantau water channel near Brothers Marine Park that would otherwise have been required to carry fill material to the reclamation site. The reduction in vessel trips reduced the noise and air impacts and minimized the disturbances to marine habitats.

Figure 5:
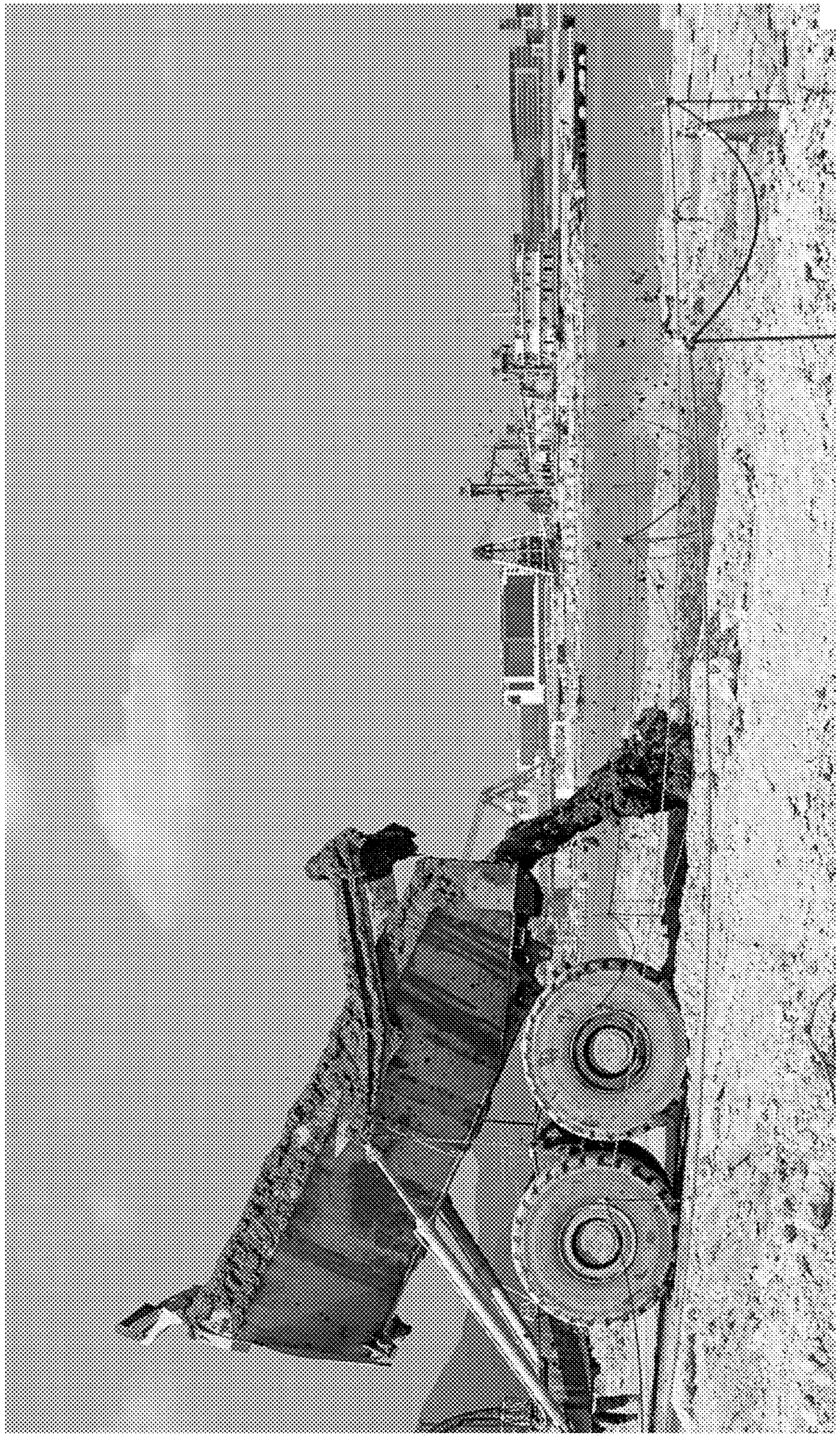
FIG. 5 depicts fresh heaved marine mud for use in the field trial of the present invention.
Figure 6:
FIG. 6 depicts mixing of the mud of FIG. 5 with the fill stabilizing compositions of the present invention.
Figure 7A:
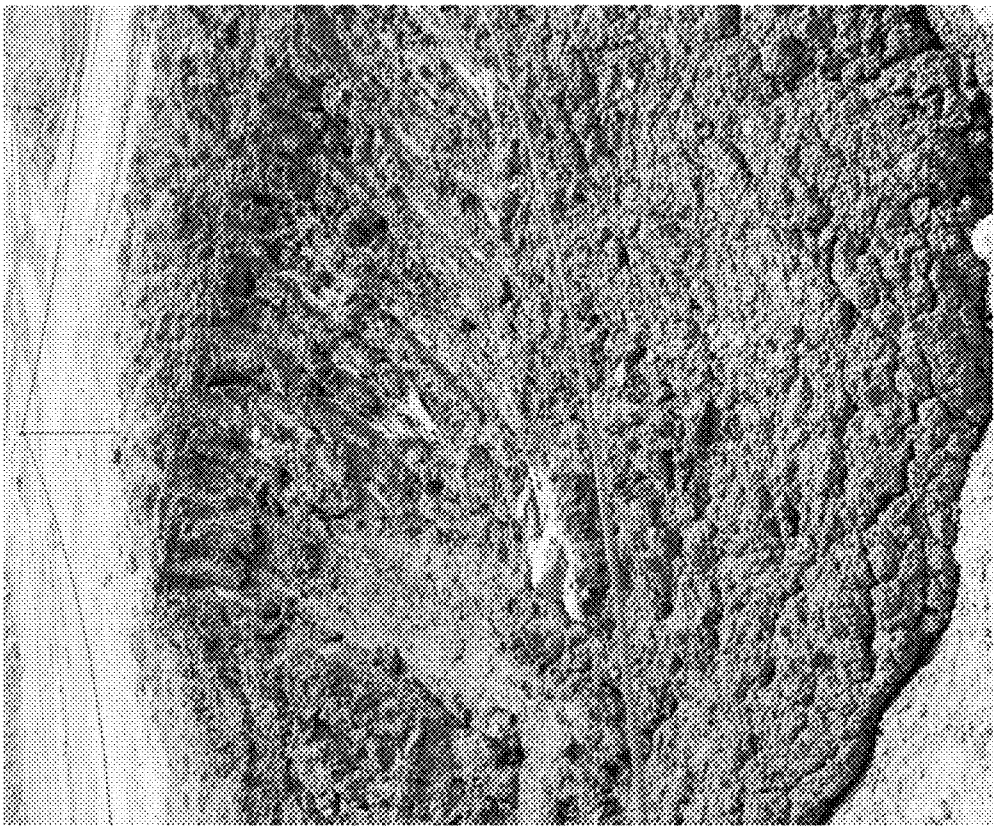
FIG. 7A shows before mixing and FIG. 7B shows after mixing of marine mud with the fill stabilizing compositions of the present invention.
Figure 7B:

The target performance of the compacted surface after eight passes of vibratory roller over the treated marine heaved material should reach a field California Bearing Ratio test (CBR) value of at least 15%. The fresh marine heaved material of FIG. 5 was treated by both traditional approach and the inventive solution, with or without sorted public fill, for comparisons. In total, thirteen site trials, each containing a volume of at least 5 cubic meters of heaved material, were conducted with both laboratory and in-situ measurement. The fill-stabilizing composition was mixed with the fill of FIG. 5 using a backhoe for mixing, as seen in FIG. 6. FIG. 7A shows the untreated mud while FIG. 7B shows the treated mud.

Figure 8:
FIG. 8 depicts the compaction process of the stabilized reclamation material using the compositions of the present invention.

Following curing for 3 hours, the treated and cured mud can be compacted, as shown in FIG. 8. As can be seen in FIG. 8, the treated and compacted material is sufficiently hard that no tire treads are made by the roller.

As demonstrated in the site trials, the sol-gel technology for accelerated soil stabilization is effective and efficient in recycling and reusing of marine heaved materials caused by reclamation work. The sol-gel technology empowered inorganic solidifier treated marine heaved material can be compacted within 3 hours with a field CBR value of over 15%, leading to a much enhanced productivity. In contrast, the traditional approach of utilizing Ordinary Portland Cement slurry is not effective as the curing process may take up to a week before any work progress is possible. It is believed that other recycling materials, such as alum sludge, and recycled glass, could also be utilized in the accelerated soil stabilization contributing to the sustainable development.

Therefore, it was determined that the compositions of the present invention are sufficient for use on actual land reclamation project site for accelerating the fill usage of heaved marine materials.

As used herein and not otherwise defined, the terms "substantially," "substantial," "approximately" and "about" are used to describe and account for small variations. When used in conjunction with an event or circumstance, the terms can encompass instances in which the event or circumstance occurs precisely as well as instances in which the event or circumstance occurs to a close approximation. For example, when used in conjunction with a numerical value, the terms can encompass a range of variation of less than or equal to ±10% of that numerical value, such as less than or equal to ±5%, less than or equal to ±4%, less than or equal to ±3%, less than or equal to ±2%, less than or equal to #1%, less than or equal to ±0.5%, less than or equal to ±0.1%, or less than or equal to ±0.05%.

While the present disclosure has been described and illustrated with reference to specific embodiments thereof, these descriptions and illustrations are not limiting. It should be understood by those skilled in the art that various changes may be made and equivalents may be substituted without departing from the true spirit and scope of the present disclosure as defined by the appended claims. The illustrations may not necessarily be drawn to scale. There may be distinctions between the artistic renditions in the present disclosure and the actual apparatus due to manufacturing processes and tolerances. There may be other embodiments of the present disclosure which are not specifically illustrated. The specification and the drawings are to be regarded as illustrative rather than restrictive. Modifications may be made to adapt a particular situation, material, composition of matter, method, or process to the objective, spirit, and scope of the present disclosure. All such modifications are intended to be within the scope of the claims appended hereto.

What is claimed is:

1. A reclamation fill stabilizing composition for accelerated soil stabilization of high water-content heaved marine mud, comprising:

approximately 15% to approximately 45% weight percent of ordinary Portland cement (OPC);

approximately 1.5% to approximately 4.0% weight percent of fly ash;

approximately 1.5% to approximately 4.0% weight percent of slag;

approximately 1.5% to approximately 4.0% weight percent of waste glass powder;

approximately 15% to approximately 45% weight percent of potassium silicate;

approximately 15% to approximately 45% weight percent of calcium oxide;

approximately 1% to approximately 3% weight percent of nano-silica;

a combined weight percentage of the OPC, the potassium silicate and the calcium oxide is approximately 90 wt %, and a combined weight percentage of the fly ash, the slag, the waste glass powder and the nano-silica is approximately 10 wt %, based on the total weight of the composition;

wherein the OPC, fly ash, slag and waste glass powder chemically react with water in high water-content waste soil for hydrolysis polymerization;

wherein the fly ash, slag, waste glass powder, and potassium silicate chemically and physically lock the water in its formed 3-D alumino-silicate microstructure and provide a gelling geopolymerization function;

wherein the potassium silicate and calcium oxide chemically and physically trap the water by reacting and bonding with the water and provide a sol-gel immobilization function;

wherein the nano-silica provides additional crystal nuclei to increase effects of the hydrolysis polymerization, gelling geopolymerization function, and sol-gel immobilization function; and wherein the reclamation fill stabilizing composition is free of organic substances and acid groups.

2. An accelerated soil stabilization process for high water-content soil comprising:

mixing the composition of claim 1 with a high water-content soil to form a treated mixture;

curing the treated mixture for a period of time between approximately 3 hours and approximately 8 hours to form a cured mixture;

compacting the cured mixture to form a compacted cured mixture.

3. The accelerated soil stabilization process of claim 2, wherein the high water-content soil is extracted marine mud.

4. The accelerated soil stabilization process of claim 3, further comprising mixing sorted recycled fill with the extracted marine mud that is mixed with the composition of claim 1 to form the treated mixture.

5. The accelerated soil stabilization process of claim 2, wherein the compacted cured mixture has a California bearing ratio (CBR) of at least 15%.

6. The accelerated soil stabilization process of claim 2, wherein the composition of claim 1 is mixed with the high water-content soil in an amount of 10-20 weight percent of the treated mixture.

7. The reclamation fill stabilizing composition of claim 1, wherein the composition is configured to allow an accelerated soil stabilization process to form a treated mixture comprising the reclamation fill stabilizing composition and extracted marine mud;

wherein accelerated soil stabilization process comprising a rapid curing time of 3 to 5 hours; and wherein the treated mixture has a California Bearing Ratio (CBR) of at least 15%.

* * * * *